United States Patent [19]
Layton

[11] 3,751,174
[45] Aug. 7, 1973

[54] HYDRAULIC SYSTEM FOR PAVER

[75] Inventor: Jack D. Layton, Salem, Oreg.

[73] Assignee: Layton Manufacturing Co., Salem, Oreg.

[22] Filed: Aug. 10, 1971

[21] Appl. No.: 170,550

[52] U.S. Cl. .............................................. 404/108
[51] Int. Cl. ............................................ E01c 19/20
[58] Field of Search .................. 94/46, 44; 404/108

[56] References Cited
UNITED STATES PATENTS

| | | | |
|---|---|---|---|
| 3,237,539 | 3/1966 | Layton | 94/46 R X |
| 3,029,714 | 4/1962 | Creswell | 94/46 R X |
| 3,288,041 | 11/1966 | Layton | 94/46 R |
| 3,000,277 | 9/1961 | Crane | 94/46 R X |
| 3,157,099 | 11/1964 | Ulrich | 94/46 R |
| 3,229,601 | 1/1966 | Philpott | 94/46 R X |
| 3,338,143 | 8/1967 | Layton | 94/46 R |
| 3,477,354 | 11/1969 | Rink | 94/46 R |

Primary Examiner—Nile C. Byers, Jr.
Attorney—Kolisch, Hartwell & Dickinson

[57] ABSTRACT

A paver having hitch arms adapted to be brought together to couple it to a towing vehicle, a gate raisable to open up discharge from the paver, and a lift actuatable to lift a screed in the paver from the ground. A hydraulic motor is provided for actuating each of the above under power. Manually operated pump mechanism drawing fluid from a reservoir is actuatable to supply fluid under pressure to each of said hydraulic motors. An electrically operated or driven pump having an intake connected to said reservoir and a system of selector valve and control valves provides for the supply of pressure fluid to each of such hydraulic motors by electrically energized means. Check valves associated with the manually operated pump mechanism, and check valves associated with the control valves supplied by the electrically driven pump permit the operation of either the manually operated pump mechanism or the electrically powered pump without interference of such operation by the pumping instrumentality which is inactive.

8 Claims, 5 Drawing Figures

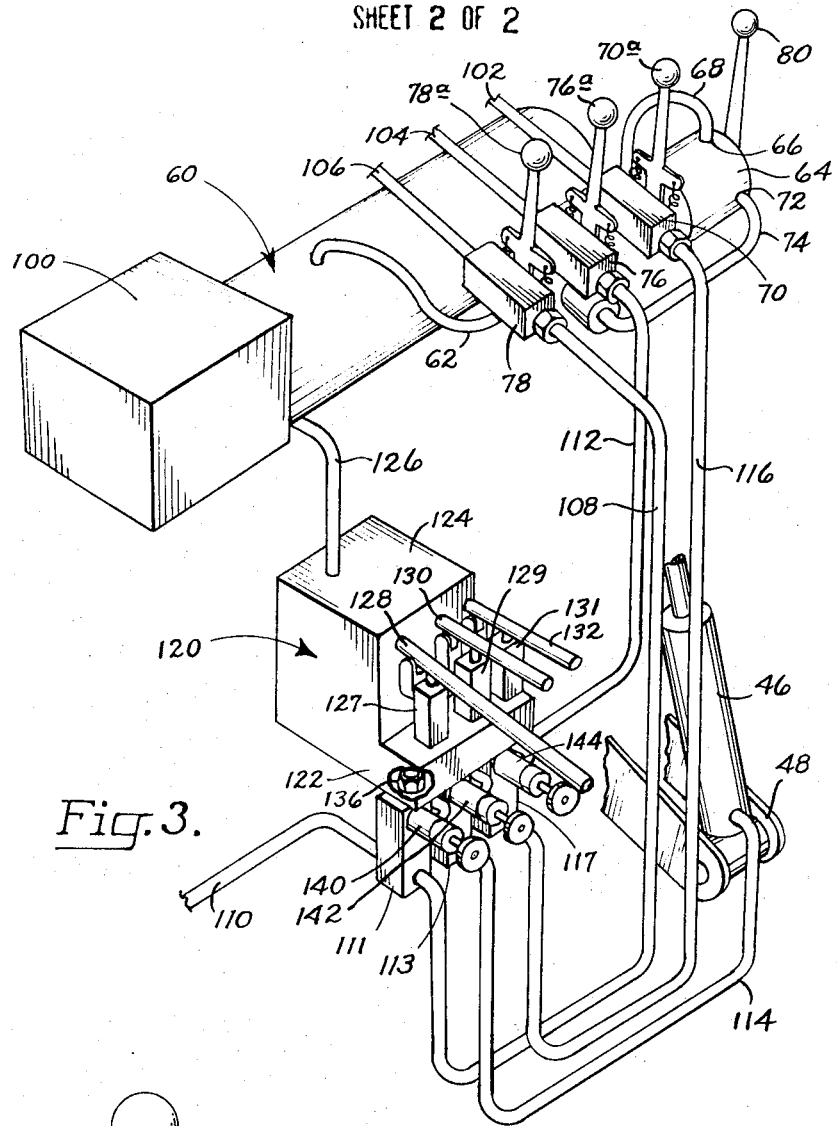
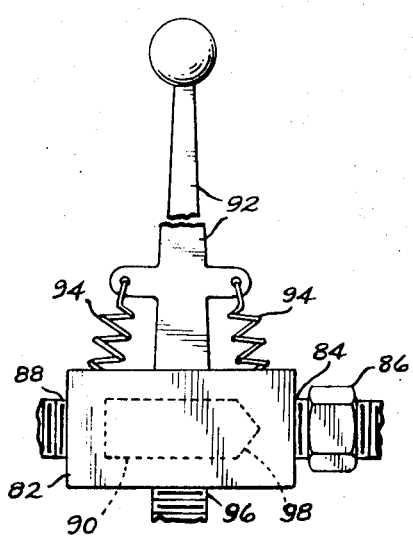
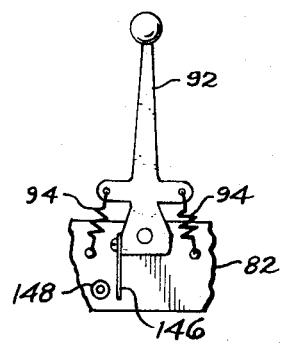
Fig. 3.
Fig. 4.
Fig. 5.

HYDRAULIC SYSTEM FOR PAVER

This invention relates to pavers or paving machines of the type that are adapted to be coupled to a towing vehicle such as a dump truck, thence to be used in the spreading of aggregate dumped from the dump body of the truck into the paving machine. U.S. Pats. of Jack D. Layton, Nos. 3,304,101 and 3,288,041, disclose certain features of particular embodiments of pavers of this general description. The pavers frequently are referred to as tow-type pavers, since it is by reason of their being towed by the vehicle to which the paver is attached that the paver is caused to be moved, with the vehicle in proper position to receive aggregate dumped from the vehicle.

In such a paver, according to constructions which are known in the art, there are a number of adjustable mechanisms which are adjusted to change the operating mode or condition of the paver. Being more specific, connecting or hitch arms located on opposite sides of the paver are brought together to couple the paver to the towing vehicle, and are spread apart to release the towing vehicle, such release being necessary when substituting a truck with a full load for a truck which has emptied its load by dumping it into the paver. Gate mechanism within the paver is adjustable to vary the size of the opening through which aggregate falls through the paver onto the ground. A so-called screed lift may be actuated to lift the screed in the paver, when it is desired to move the paver from one area to another. For speed and convenience, it is usual to rely upon hydraulic means for producing adjustment in such mechanisms.

It has further been proposed to provide electrically powered means, such as an electrically driven pump, for supplying the fluid under pressure necessary to actuate the various hydraulic motors described. This greatly facilitates the speed with which an adjustment may be made, and from an operator's standpoint is desirable, in that far less effort is required in making an adjustment.

The use of an electrically powered pump for supplying pressure fluid has certain disadvantages. A portable electrical source, such as a battery, can provide only a limited amount of electrical energy before being drained. Any construction which is to be practicable, therefore, should be of the type that minimizes the drain of power from the electrical source, and which accommodates manually powered operation in an emergency without complicated and extensive changes made in the controls for the paver.

A general object of the invention therefore is to provide, in a tow-type paver, having multiple hydraulic motors for making adjustments in mechanisms contained therein, the combination of hand operated and electrically powered pumping devices, so organized that each may be used in supplying the pressure fluid necessary for paver adjustments, with the operation of one pumping instrumentality being substantially completely independent of the other. Further, as contemplated herein, switching from the use of one instrumentality to the other requires no extensive adjustments, or fitting changes, that would complicate the operation of the paver.

Another object of the invention is to provide, in combination with a paver, a system of hydraulic motors for making operating adjustments, and means for supplying pressure fluid to such motors including an electrically driven pump device, so organized that during use of the paver there is minimal drain on the source of electrical energy which supplies the pump.

Yet another object of the invention is to provide such a paver, with a unique control system for controlling the delivering of fluid under pressure to hydraulic motors which control adjustments, the system being simple and reliable.

These and other objects and advantages of the invention will become more fully apparent as the following description is read in conjunction with the accompanying drawings, wherein:

FIG. 3 is a perspective view, on a somewhat enlarged scale, illustrating the hydraulic system provided to supply fluid to hydraulic motors in the paver;

FIG. 4 is a view on a still larger scale illustrating, in simplified form, one of the control valves utilized in the hydraulic system; and FIG. 5 illustrates portions of a control valve viewing the side equipped with a control handle.

Figure 1:
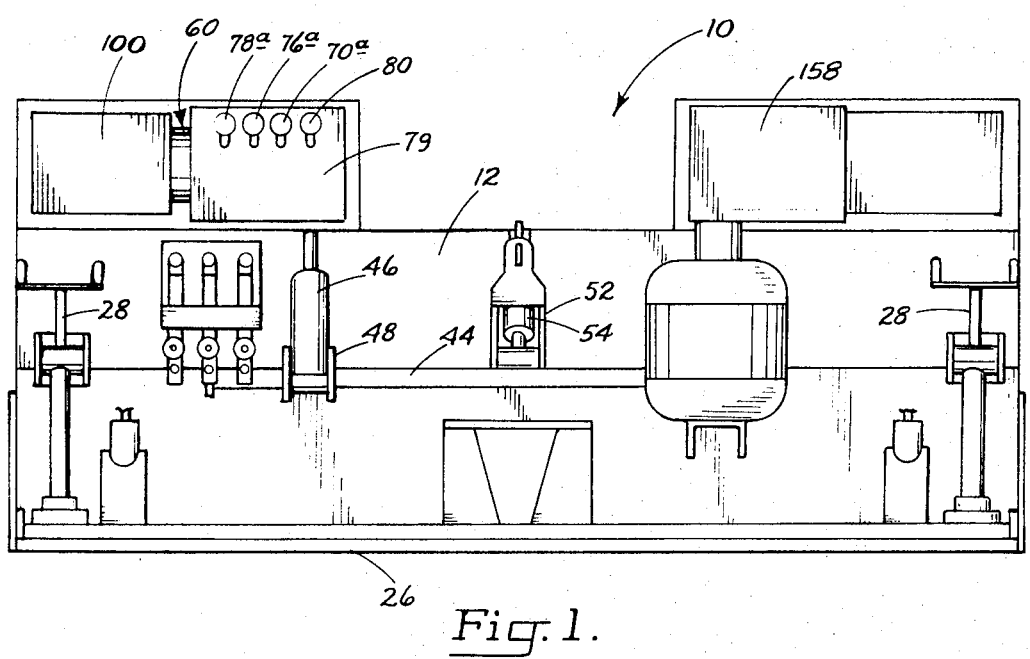
FIG. 1 is a somewhat simplified, rear elevation view of a paver as contemplated herein.
Figure 2:
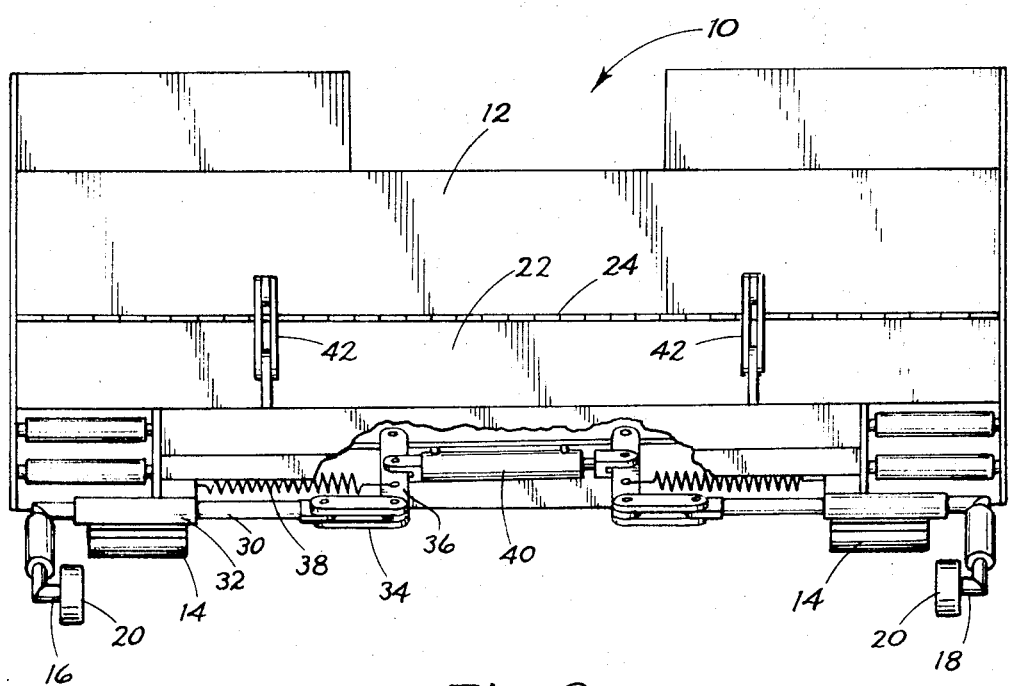
FIG. 2 is a simplified view, looking at the front and slightly downwardly on the paver shown in FIG. 1.

Referring now to the drawings, and first of all more particularly to FIGS. 1 and 2, the paver is indicated generally at 10. Such includes a hopper or box 12 suitably mounted on a frame in the paver, which is positioned under the rear end of the dump body in a dump truck when coupled to such a vehicle. The forward portion of the paver is supported for travel over the ground on ground traveling devices such as tracks 14. Connecting or hitch arms 16, 18 projecting forwardly from the box in the paver are brought together to place rollers 20 at the forward extremities of these arms within the confines of the inner peripheries of the rims of the rear wheels of the drawing vehicle, thus to couple the paver to the vehicle. A gate is shown at 22 in FIG. 2 extending across the bottom of the hopper or box, such being hinged to the hopper at 24. The gate may be dropped with the forward margin of the gate swinging downwardly to open up the hopper, thus to permit discharge onto the ground of aggregate contained in the hopper.

Referring to FIG. 1, what is referred to as a screed is shown at 26. The screed is adjustably positionable with respect to the rest of the paver using turn shafts 28. As the paver is advanced over the area being paved the screed serves to level and partially to compact the aggregate flowing from the base of the hopper.

Each of the arms 16, 18 includes a journal portion 30 rotatably and axially received in a sleeve 32 fixed in the paver. Joined to the inner extremity of each journal portion is link structure 34, and a pivoted arm 36, which is pivoted, in effect, to the frame of the paver at its rear end. A spring, such as spring 38, interposed between each arm and the paver frame functions to bias the arm to which it is connected, whereby its forward extremity is urged outwardly. A single acting hydraulic motor or ram 40 interposed between the arms 36 is contracted by the supply of pressure fluid to the cylinder of the ram, to cause arms 36 and the hitch arms connected thereto to be brought toward each other. It will be noted that fluid under pressure is used only to bring the arms together, with outward movement being produced through the springs, which introduce forces externally of the hydraulic ram 40.

Considering in further detail the gate 22, joined to the gate is linked structure 42 (see FIG. 2) which is joined to a bar 44 (see FIG. 1) mounted against the rear side of box 12. The bar is rotatably mounted for rotational movement about its longitudinal axis. A hydraulic motor or ram 46 with the rod end thereof mounted on the box and the cylinder end thereof journaled on lever structure 48 connected to rod 44, is actuated by the admission of pressure fluid thereto, to extend the ram and to rotate rod 44. This has the effect of raising the gate which closes off the opening that extends along the bottom of the box. The gate swings downwardly to open up this opening, under its own weight, and the weight of aggregate contained within the hopper. This opening therefore is also done by forces generated externally of ram 46.

With the paver coupled to a dump truck, it is sometimes desirable to lift the screed and the rear portions of the paver whereby the paver rides over the ground supported only on tracks 14. To do this a chain may be attached to the tailgate of a dump truck, and such extended downwardly back over the top of the paver to have its end joined to a swingable lever structure 52. The lever structure is journaled to the paver for pivotal movement about a horizontal axis extending between the sides of the paver. With the chains attached in this manner and with the structure swung downwardly as viewed in FIG. 1, the chain is tensioned to produce a lifting effort on the screed at the rear of the paver. This downward movement of the lever structure is produced hydraulically by introducing pressure fluid to a ram 54 interposed between the lever structure and the paver frame. With the screed elevated, and to lower the screed, fluid is permitted to exhaust from the ram, with the ram extending as the weight of the paver causes the rear end thereof to drop to the ground. Again, this adjustment in the paver i.e., lowering of the screed, is produced by forces generated externally of ram 54.

Details of the hydraulic system utilized in providing the fluid under pressure to actuate the rams 40, 46 and 54 are best illustrated in FIGS. 3 and 4. The system, as will be apparent, includes a fully powered system, wherein the pressure fluid is produced by an electrically operated pump, as well as a manually powered system, wherein the pressure fluid is obtained by the manipulation of hand pumping mechanism. As further will be apparent, essentially no adjustments are required to shift from one mode of operation to the other. Further, while both pumping instrumentalities draw fluid from the same reservoir, the operation of one is essentially independent of the other. Finally, the organization is such that using the electrically powered pump, there is minimal drain on the electrical source by the battery which is carried on the paver. With the system disclosed, it is possible at any time, when for instance it is desired to conserve electrical power, to utilize the hand pumping mechanism. Further, and in the event that the battery does become drained, adjustments in the paver may be made using the hand operated pumping mechanism provided.

Referring now to FIG. 3, an electrically operated pump is designated at 60, which includes an electric motor and a pump assembled together as a unit. The pump discharge is connected to a conduit 62 which leads from the pump to a connection with a selector valve 64. The connection with the selector valve is on the under side of the valve in FIG. 3, and thus obscured in the drawing.

The selector valve has three outlet ports. One of these, i.e., port 66 shown at the top of the valve, connects through a conduit 68 with a control valve 70, one of a group of three disposed in a bank at the rear of the paver. Outlet port 72 of the selector valve connects through a conduit 74 with another of the control valves shown at 76. The third and final outlet port, which is to the rear of the selector valve in FIG. 3 and thus obscured, connects through a conduit (not shown) leading to the rear of the third control valve, shown at 78.

The selector valve has a rotatable spool therein which is moved through manipulation of a handle 80, and includes three adjusted positions. In one, pressure fluid is directed by the selector valve into control valve 70. In another, the fluid is directed into control valve 76, and in another the fluid is directed into control valve 78.

In FIG. 1, the selector and control valves are shown enclosed within a housing 79, with handle 80, and handles 70a, 76a, and 78a for the control valves, projecting through this housing.

Considering now the construction of a control valve, and referring also to FIG. 4, the construction of the various control valves is similar, and only one will be described in detail. Each includes a housing 82, an outlet port 84 fitted with a check valve assembly 86 checking the flow of fluid into the housing through the outlet port, and an exhaust or dump port 88 at the rear of the housing. Mounted within the housing is an elongated quill 90 which extends between the outlet and exhaust ports, and which with the valve in a neutral position lies intermediate the two ports. A manipulating handle 92, normally held in a neutral position by springs 94, is operatively connected to the quill to shift it axially, either toward the outlet port or toward the exhaust port. With the quill moved against the exhaust port, which is performed by shifting handle 92 toward the left in FIG. 4, the end of the quill is caused to come up tightly against a seat within the valve housing to close the exhaust port tightly. With pressure fluid admitted to the valve through its inlet port, shown in FIG. 4 at 96 (which is the port that is connected to the selector valve), such is directed out the outlet port of the control valve, with opening up of the check valve in assembly 86. With handle 92 shifted toward the right in FIG. 4 the quill is moved whereby an end 98 moves against the ball in the check valve to unseat it. At the same time the exhaust or dump port is opened, and in this condition of the valve, fluid may flow into the outlet port and be exhausted out of the dump port.

The exhaust ports of the various control valves are joined to a reservoir 100 for holding a supply of hydraulic fluid. Thus, in FIG. 3 the exhaust port of valve 70 is connected with the reservoir through conduit 102 (shown broken off). Conduits 104, 106 in a similar manner join the exhaust ports of valves 76, 78, respectively, with the reservoir.

Valve 78 is the control valve controlling operation of the hitch arms. Its outlet port is shown joined to outlet or discharge conduit 108, which connects through a block 111 to motor feed conduit 110, the latter connecting with ram 40, which is the ram that is actuated to bring the hitch arms together.

The outlet port of valve 76 is joined by outlet or discharge conduit 112 and through block 113 to motor feed conduit 114 connecting with ram 46, which is extended to swing lever structure 48 downwardly with closing of gate 22.

The outlet port of valve 70 is connected through outlet or discharge conduit 116 and through block 117 to a motor feed conduit (not shown) which connects with ram 54 utilized in raising or lifting the screed when such is desired.

Further describing the hydraulic system contemplated, a hand or manually operated pumping means or instrumentality is illustrated at 120. Such includes a housing 122 which at the rear thereof includes a portion 124 for containing a supply of pressure fluid. Such is connected through conduit 126 to the reservoir 100 of the electrically operated pump, whereby portion 124 and reservoir 100 function as a common sump in the system.

Pumping means 120 includes three plunger type pumps 127, 129, 131 manipulated by handles 128, 130 and 132. The pumps are all similar, and each comprises, as described in connection with pump 127, a plunger which is reciprocated up and down by up and down movement of its handle, to force fluid under pressure out through an outlet port at the base of housing 122. The outlet port or discharge of each pump is equipped with a check valve such as is shown at 136, which checks the flow of fluid in a direction into the pump through the outlet port. Downstream from the check valve fluid may flow through a passage in the block, below the pump (block 111) into the passage extending through the block which connects an outlet conduit with a motor feed conduit (conduits 108, 110).

Each hand pump also is provided with a bypass valve, such as that shown at 140 for pump 127. The bypass valve when opened up bypasses the check valve for the hand pump, to join the passages within a block such as block 111 directly with reservoir portion 124. The bypass valves for pumps 129 and 131 are shown at 142 and 144. It will be seen from the description that an outlet or discharge conduit from a control valve such as vale 78 connects with a motor feed conduit exemplified by motor feed conduit 110 at a point relative to the hand pump which is downstream from the check valve for the associated hand pump.

Referring now to FIG. 5, each handle of a control valve is equipped with a contact finger 146 of a switch means associated with the valve, such finger depending from the base thereof. When the handle is moved in a direction closing off the exhaust or dump port in the valve (to the right in FIG. 5) this finger contacts a contact 148 which is supported on the paver through an insulator adjacent the base of the valve housing. The contact is connected through a conductor (not shown) with a starter assembly (not shown) for the motor of the electrically driven pump. The opposite side of the starter assembly is connected in the usual manner to the positive terminal of a battery (housed within housing 158 in FIG. 1), and the negative terminal of the battery is grounded in the usual manner.

Describing now the operation of the apparatus, normally the various bypass valves 140, 142, and 144 are placed in a closed position. When it is desired to operate one of the adjustment mechanisms on the paver, for example the hitch arms, to bring them together (if this to be done manually), the pump 127 is pumped through up and down movement of handle 128. This forces pressure fluid into the motor feed conduit 110 causing contraction of ram 40. With pumping stopped, the ram is locked in place, with backflow of fluid into the hand pump being blocked by check valve 136, and the check valve corresponding to valve 86 effectively isolating control valve 78. To cause the hitch arms to move apart (as when releasing a dump truck), bypass valve 140 is opened up, to enable fluid to escape to the reservoir as such dumps from ram 40 under the action of springs 38.

If it is desired to use the electrically powered pump in this operation, the selector valve is adjusted to place it in a condition connecting its inlet port with the outlet port feeding control valve 78. Handle 78a for control valve 78 is pushed to the left in FIG. 3, to close the dump port in the control valve and also to start the motor for the pump. This causes pressure fluid to be directed by the control valve into outlet conduit 108, thence to be fed to motor feed conduit 110, to cause contraction of ram 40. Using this mode of operation, and since bypass valve 140 is normally closed, the hand pumping instrumentality is effectively isolated.

To cause the arms to spread apart, control handle 78a is moved to the right in FIG. 3, with the quill in the control valve displacing the ball in the check valve corresponding to valve 86. The arms move apart under the urging of springs 38, with the fluid exhausting from ram 40 returning to the sump through the now opened check valve and the dump port in valve 78 corresponding to dump port 88.

It will be noted that with the organization, and when the electrically powered pump is utilized, the motor of the pump is operated only during such time as there is a demand for pressure fluid. Further, each operating mechanism requires pressure fluid only for one half of its operating cycle. Return adjustment of the operating mechanism is by forces generated externally of the ram associated with the mechanism. In the case of the hitch arms, the springs produce this return movement. In the case of the screed lift or the gate, gravity provides the force returning the mechanisms to their at rest positions. This feature of the organization is effective in minimizing the drain on the source of electrical energy provided to run the pump.

It should be further noted that there are no extensive adjustments needed to switch from one mode of operation to the other. For instance, using the hand pump for the hitch arms the control valve 78 automatically is isolated from the system by check valve 86. If it is desired to take over with the electrically driven pump during bringing of the hitch arms together, the operator need only appropriately move the control handle for valve 78. Immediately pressure fluid is generated electrically, and the hand pump is isolated automatically through check valve 136.

While the operation of the system has been described in detail in connection with the hitch arms, it should be obvious that the operation of the gate and screed lift mechanisms is essentially the same. To make the electrically driven pump part of the hydraulic system for these two mechanisms, all that is required is appropriate adjustment of the selector valve, whereby the proper control valve is placed in the system.

The inclusion of a check valve on the downstream side of each control valve, and downstream of each hand pump, has decided advantages. Considering, for instance, the hitch arms, once they have been brought together into proper relationship with the wheels of the towing vehicle, it is extremely important that they be hydraulically locked in place and that there be no gradual working of the arms apart (as would be the case if there were hydraulic leakage in the system). The check valves absolutely prevent such leakage, and assure that once an adjusted position has been attained, such is maintained for the period desired.

While a specific embodiment of the invention has been described herein, it should be obvious that variations are possible without departing therefrom.

It is claimed and desired to secure by Letters Patent:

1. In combination with a paver having hitch arms adapted to be brought together to couple the paver to a towing vehicle, a first hydraulic motor for bringing the arms together under power, a gate raisable to open up discharge of aggregate from the paver, and a second hydraulic motor for raising the gate, a reservoir for holding hydraulic fluid,
   a first motor feed conduit connecting with said first hydraulic motor for supplying fluid thereto to actuate the motor, and a second motor feed conduit connecting with the second hydraulic motor for supplying fluid thereto to actuate the motor,
   manually operated pump means having an intake connected to said reservoir and a discharge, means connecting said discharge to said first and second motor feed conduits, said pump means being selectively operable to deliver hydraulic fluid either to said first or to said second motor feed conduit,
   the means connecting said discharge with said first and second motor feed conduits including a first check valve checking flow from the first motor feed conduit into the pump means and a second check valve checking the flow from the second motor feed conduit into the pump means,
   a bypass valve for each of said check valves openable to bypass the check valve,
   an electrically driven pump having an intake connected with said reservoir and a discharge, and means connecting said discharge of said electrically driven pump to said first and second motor feed conduits,
   said means connecting said discharge of the electrically driven pump including selectively operated valve means for directing fluid selectively to said first or to said second motor feed conduit, the connection with said first motor feed conduit being located relative to said manually operated pump means downstream of said first check valve and the connection with said second motor feed conduit being located relative to said manually operated pump means downstream from said second check valve.

2. The combination of claim 1, wherein the first and second hydraulic motors each comprise a single acting hydraulic ram, actuated with a supply of fluid thereto to bring the arms together and to raise the gate, respectively, the arms being movable apart and the gate lowering by forces generated externally of the rams and the rams during such movement forcing fluid in a return direction toward the manually operated pump means, and wherein said means connecting the discharge of the electrically driven pump to said first and second motor feed conduits includes check valve means checking flow in a direction toward the electrically driven pump.

3. The combination of claim 1, wherein the electrically driven pump includes a motor on said paver which drives the pump, and which further includes switch means actuated to start said motor disposed so that actuation is coordinated with actuation of the selectively operated valve means for directing fluid selectively from the electrically driven pump to said first and said second motor feed conduits.

4. The combination of claim 1, wherein said selectively operated valve means for directing fluid selectively to said first and second motor feed conduits includes a first control valve controlling flow to the first motor feed conduit and a second control valve controlling flow to the second motor feed conduit, each control valve including an inlet port connected to the electrically driven pump, a first outlet port connected to a motor feed conduit, and a second outlet port connected to said reservoir, the connection of said outlet port of each control valve with the motor feed conduit including a check valve checking flow from the motor feed conduit into the control valve.

5. The combination of claim 4, wherein the electrically driven pump includes a motor on said paver which drives the pump, and which further includes switch means for each of said control valves actuatable to start the motor and disposed so that actuation is coordinated with actuation of the control valve.

6. The combination of claim 4, wherein said selectively operated valve means for directing fluid selectively to said first or said second motor feed conduit further includes a selector valve, the connection of each of said control valves with the electrically driven pump being through said selector valve, the selector valve having one adjusted position where hydraulic fluid pumped by the electrically driven pump is directed to one control valve exclusively of the other, and another adjusted position wherein fluid pumped by the electrically driven pump is directed to the other control valve exclusively of the one.

7. In combination with a paver having hitch arms as one adjustable mechanism thereon, and another adjustable mechanism which together with the hitch arms is adjusted to modify paver operation, a first hydraulic motor for adjusting one of said mechanisms under power and a second hydraulic motor for adjusting the other of said mechanisms under power,
   a reservoir for holding hydraulic fluid,
   an electrically operated pump having a discharge, and an intake connected to said reservoir to draw fluid therefrom,
   a selector valve having an inlet port connecting the discharge of said pump and at least a pair of outlet ports, a first control valve connected to one outlet port of said selector valve and a second control valve connected to the other outlet port of said selector valve,
   each of said control valves having a dump port connected to said reservoir, an outlet port, and a spool shiftable axially to close selectively either one or the other of said ports,
   a discharge conduit including a check valve connected to each outlet port with the check valve checking flow in the conduit toward the control valve, first and second manually operated pumps, each having an intake connected to said reservoir, a discharge, and a check valve in the discharge checking flow from the discharge into the pump, a first motor feed conduit connecting said first manually operated pump through the check valve of the pump to said first hydraulic motor and a second motor feed conduit connecting said second manually operated pump through the check valve of the pump to said second hydraulic motor, and a connection of one discharge conduit with said first motor feed conduit at a point relative to said first manually operated pump which is downstream from its check valve, and a connection of the other discharge conduit with the second motor feed conduit at a point relative to said second manually operated pump which is downstream from its check valve.

8. The combination of claim 7, wherein the first and second hydraulic motors each comprise a single acting hydraulic ram, each of said rams being actuated with a supply of pressure fluid thereto to adjust a mechanism, each mechanism returning to its original condition by forces generated externally of the ram and during such adjustment forcing fluid in a reverse direction through the feed conduit which connects with the motor, and which further comprises a bypass for the check valve of each manually operated pump manually openable to permit reverse flow of fluid therethrough to said reservoir, and wherein each control valve includes a release for the check valve in the discharge conduit which connects with the control valve to accommodate reverse flow therethrough.

* * * * *